March 11, 1969     E. A. GILLIS     3,432,363

HIGH TEMPERATURE FUEL CELL ELECTROLYTE CARRIER

Filed Nov. 12, 1963

Inventor
Edward A. Gillis
Attorney

United States Patent Office 3,432,363
Patented Mar. 11, 1969

3,432,363
HIGH TEMPERATURE FUEL CELL ELECTROLYTE CARRIER
Edward Allan Gillis, Milwaukee, Wis., assignor to Allis-Chalmers Manufacturing Company, Milwaukee, Wis.
Filed Nov. 12, 1963, Ser. No. 322,952
U.S. Cl. 136—153          7 Claims
Int. Cl. H01m 27/02, 43/06

This invention relates to fuel cells. More particularly, this invention relates to new and improved electrolyte carriers suitable for use in fuel cells having a molten electrolyte.

A fuel cell, briefly, is an electrochemical device for the conversion of chemical energy into electrical energy. This energy conversion eliminates the intermediate step of first converting the chemical energy to thermal energy, prior to conversion to electrical energy. The outstanding efficiency of the fuel cell energy conversion is an important advantage and has resulted in increased interest in developing a practical fuel cell. The absence of moving parts; little noise or vibration; excellent resistance to shock, acceleration, vibration and radiation; and high energy to volume and high energy to weight ratios are a few of the fuel cell's additional advantages.

This invention has particular application to those fuel cells which utilize molten compounds, such as the alkali carbonates and the like, as an electrolyte. Such fuel cells are well known in the art and are amply described in the literature. In most fuel cells of the molten electrolyte type, the electrolyte serves not only to transport ionic charge between the electrodes, but also acts as a barrier to the free passage of reactants between the electrodes. If the gaseous reactants pass uninhibited through the electrolyte barrier between the electrodes and intermix, a serious condition can develop. Once a direct line of communication between the reactants is established, they can react directly rather than electrochemically. This direct reaction is known as chemical short circuiting of the cell. At best, chemical short circuiting results in lost performance and if pronounced, the cell is rendered useless.

In the past, the molten electrolyte has been immobilized and carried within the pores of a refractory material. Refractory particles of uniform fineness were sintered into a porous carrier and then impregnated with electrolyte. One refractory commonly used for carrying the electrolyte has been magnesia. The disadvantages encountered with magnesia carriers, as they have been constructed, are typical of existing refractory electrolyte carriers. Because these present refractory electrolyte carriers are brittle, they have been prone to develop mechanical stress cracks. In order to minimize cracking and gain mechanical strength, these carriers have been made in a disc shape, since this geometry has the most uniform distribution of stress. Yet, the present carriers are nevertheless limited in size regardless of strength gained by this disc shape. Known carriers must remain wafer thin so as to avoid thermal cracking of the refractory during temperature changes. Because the thickness must remain so very thin, enlarging the diameter of the carrier without a corresponding increase in thickness makes the carrier intolerably fragile. Carriers presently known have been found unsatisfactory with a diameter of as little as 5 centimeters.

The carrier is subject to a further and more pronounced source of cracking. Each time the cell is shut down the electrolyte within the porous carrier solidifies. When the cell is heated in returning it to operation, the electrolyte melts. The refractory carrier material exemplified by magnesia and the electrolyte have differing coefficients of expansion. Therefore, whenever the electrolyte changes phase within the porous refractory carrier, expansive or contractive forces arise. During transition of the electrolyte melt between the solid and liquid phase, the volume of the electrolyte may change as much as 5%. These forces are inevitably relieved by some rupturing of the refractory carrier. When the rupture is pronounced, a fissure develops extending through the thickness of the carrier.

Even a small crevice in the refractory carrier caused by stress or thermal cracking often become enlarged into a fracture. This enlargement results from the molten electrolyte washing the loosened particles of the sintered refractory away from the carrier body. The consequence of any disturbance of the integrity of the refractory carrier, whether caused by a fracture resulting from mechanical fragility or thermal cracking, comprises the gas tightness of the cell.

The low reliability of refractory electrolyte carriers has caused many in the art to abandon them in favor of paste electrolyte. Paste electrolytes comprise a pelletized mixture of inert carrier powder, such as magnesia, and an electrolyte such as the alkali carbonates. When heated to operating temperature, the electrolyte melts within the interstices of the soid carrier powder thus forming a pasty mass. Paste electrolytes are not the complete answer to the problem because of their propensity to cake and settle.

Accordingly, the general object of my invention is to provide a fuel cell electrolyte carrier which maintains the gas tight integrity of the cell.

A further object of my invention is to provide a fuel cell electrolyte carrier for molten electrolytes which may be fabricated in a variety of shapes without sacrifice of dimensional strength.

Another object of my invention is to provide an electrolyte carrier for fuel cells which can be repeatedly subjected to the variations in temperature experienced during the transition from shut down to operation without developing cracks completely therethrough.

A still further object of my invention is to provide a fuel cell electrolyte carrier which maintains uniform contact between the electrolyte and the electrodes despite irregularities in the electrode surface.

Another object of my invention is to provide a fuel cell electrolyte carrier which may be compressed between the electrodes without developing cracks which extend completely through the carrier.

A further important object is to provide a fuel cell electrolyte carrier which is resistant to permeating cracks.

Other objects and advantages of the present invention will become apparent from a further reading of the following description and appended claims.

The present invention includes an electrolyte carrier matrix which comprises in combination a thin, flat, malleable porous support core, and a porous refractory material adherent upon each face of the support core, whereby a reinforced electrolyte carrier matrix structure is formed which is resistant to stress and thermal cracking.

According to another preferred embodiment of the present invention, the electrolyte carrier matrix also comprises in combination, a thin porous plate formed from a malleable material, having a porous refractory material adherent upon the central portion of each face of said plate, and the outer periphery of said plate sealed with a vitreous, nonporous refractory material whereby a reinforced electrolyte carrier matrix is formed carrying the electrolyte within the porous structure of the plate and the central refractory portion while said outer refractory portion seals the matrix from electrolyte creepage.

The novel features which are considered as characteristic for the invention are set forth in particular in the appended claims. The invention itself, however, both as to its construction and its operation, together with additional objects and advantages will be best understood from the following description of specific embodiments when read in connection with the accompanying drawing, in which:

Figure 1:
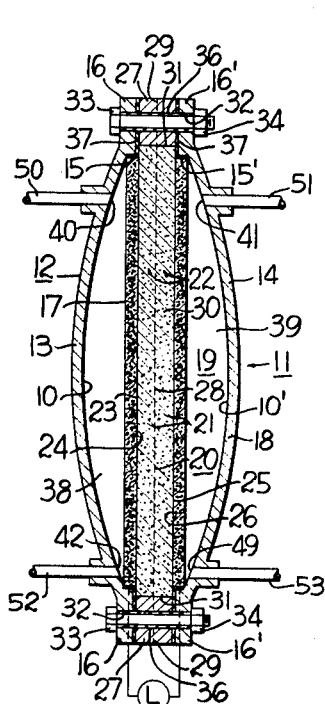
FIG. 1 is a schematic view of a fuel cell incorporating the electrolyte carrier matrix of my invention.

Referring now to the drawing and particularly to FIG. 1, the fuel cell 11 comprises a housing 12 having endwalls 13, 14. Each endwall, for example, end wall 13, has an outwardly turned flange 16 and a dish-shaped portion 10 located about a circumferentially recessed seat 15. Electrode 17 is mounted in seat 15 of endwall 13 in spaced relation to electrode 18 which is mounted in a similar seat 15' of endwall 14. One of the electrodes 17 serves as a fuel electrode and the other electrode 18 as the oxidant electrode.

Sandwiched intermediate the electrodes 17, 18 is an electrolyte carrier matrix 19. Matrix 19 comprises a central portion 30 and a peripheral portion 31. Embedded in the matrix is an inner core 20 having a central portion 28 and a peripheral portion 29. A porous refractory material 21 surrounds central portion 28 of the core 20 and carries an electrolyte 22 within its pores. The outer surface 23 of refractory 21 is in substantially adherent contact with the inner surface 24 of electrode 17. Likewise outer surface 25 of refractory 21 is in substantially adherent contact with the inner surface 26 of electrode 18. The peripheral portion 31 of matrix 19 is preferably sealed with a nonporous material 27 applied to portion 29 of core 20.

Located about flange 16, 16' of each endwall 13, 14 and about the peripheral portion 31 of matrix 19 are complementary holes 32. Suitable fastening means, for example, bolt 33 and nut 34, extend through holes 32 and when nut 34 is tightened about bolt 33, flanges 16, 16' of endwalls 13, 14 with the peripheral portion 31 of matrix 19 therebetween are brought into a gas tight, surface engaging alignment. Bolt 33 is electrically insulated from contact with matrix 19 by means of an asbestos sleeve 36. A mica gasket 37 about the seating means 15 electrically insulates the electrodes 17, 18 from the housing 12.

A fuel gas space 38 is defined between dish-shaped portion 10 of endwall 13 and electrode 17. In a similar fashion oxidant gas space 39 is defined between portion 10' of endwall 14 and electrode 18. Suitable piping means 50, 51 communicate with each gas space 38, 39 to provide for the entry of reactants through inlet ports 40, 41. Outlet ports 42, 49 extend into each gas space and piping means 52, 53 are provided to exhaust the waste gases from the cell through these ports.

With special reference to FIGS. 2 and 3, the electrolyte carrier matrix 19 will now be described in detail. This matrix 19 comprises a malleable porous support core 20 that is resistant to the corrosive action of the electrolyte at fuel cell operating temperature. Silver and nickel are structural materials which I have found to be particularly suitable for the manufacture of core 20. Generally, tantalum, gold and the other members of period VIII of the periodic table can be used. These metals may be beneficially alloyed with each other to form a flexible and strong core 20. The preferred material because of its exceptional combination of stability and flexibility is silver.

Figure 2:
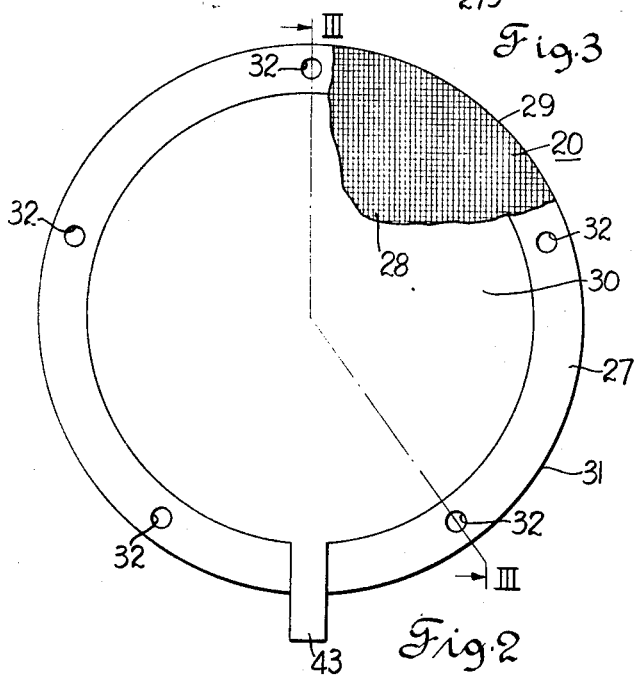
FIG. 2 is a plan view of the electrolyte carrier matrix, with a cutaway portion showing the interior of the matrix.

As may be seen from the cutaway portion of FIG. 2, core 20 advantageously comprises a screen or gauze fabricated from the aforementioned materials. A preferred screen is one woven in a plain square weave of 50–100 mesh Tyler Standard. The mesh size designates the number of meshes per linear inch. Because the mesh number alone does not indicate the aperture size or the wire diameter, these screen qualities cannot be determined unless the mesh number is related to some standard mesh. In the Tyler Standard scale, 100 mesh relates to a plain weave having an opening of 0.0058 inch and a wire diameter of 0.0042 inch. The weave of the screen, however, is not limited to a plain mesh weave. Other known weaves such as twilled mesh, plain Dutch, twilled Dutch and the like are suitable. The screening weave selected should have an aperture size comparable to 50–100 Tyler Standard plain mesh.

Figures 3, 4:
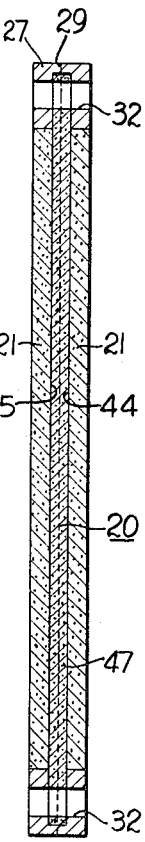
FIG. 3 is a cross sectional view through line III—III of FIG. 2.
FIG. 4 is a cross sectional view of a modified form of my electrolyte carrier.

In the manufacture of the emobdiment of matrix 19 shown in FIGS. 2 and 3, the screening for core 20 is cut to assume the outer configuration of the finished matrix. This configuration is usually circular. The surprising strength gained through the inclusion of core 20, however, enables the outer configuration to assume any shape that the cell design calls for. After cutting to size, holes 32 are drilled in portion 29 of core 20. The peripheral portion 29, excepting tab 43, of core 20 is masked and a refractory material to comprise layer 21 is affixed to each of the opposing faces 44, 45 of portion 28 of core 20 and unto tab 43. The refractory may comprise any high melting material which is indifferent to the corrosive action of the electrolyte. When the electrolyte is an alkali carbonate the preferred refractory for forming layer 21 is magnesium oxide or aluminum oxide. A convenient method of applying the refractory layer 21 is flame spraying. Flame spraying techniques of applying a refractory to a substrate are well known and do not require elucidation here.

In the practice of my invention, it is preferred that the refractory layer 21 applied to core 20 have a particle size such that the pore size of the carrier is less than the pore size of the electrodes. Particles of —400 mesh have been used, but generally particles of —100 mesh will produce the desired capillary potential in the carrier. Porosity refers to the ratio of volume of the interstices of a material to the volume of the mass expressed in percent. The inclusion of core 20 enables the use of refractory particles sized to obtain a refractory having a porosity of up to 70%. Particles producing an even greater porosity can be used, but the mechanical strength of the carrier will suffer. In prior art carriers the refractory was required to have a uniform particle size so as to obtain proper sintering. In the manufacture of matrix 19 such a narrow fraction is not required so long as there is not an excessive amount of microporous or extremely large particles. For example, I have successfully used an $Al_2O_3$ grit which is commonly used for coating abrasive papers. Relative uniformity of individual particle size does however result in uniform size pores. Therefore, the refractory powder used should preferably have a particle size within a range of ±50 Tyler mesh.

Each face 44. 45 of portion 28 of core 20 is flame sprayed so that a refractory layer 21 forms having a depth of about 10 mils. A refractory coat of a lesser thickness is operable, as is a coating of greater thickness. I have found, however, that a coating of less than 10 mils in depth will not contain appreciable electrolyte, and during periods of high current drain on fuel cell 11 the electrolyte may become locally exhausted at random points on surface 24 of the fuel electrode. This will result in lost output. On the other hand a thicker coat than is required for efficient operation is undesirable because the additional thickness only adds to the internal resistance of the cell.

If a paste electrolyte is desired, the refractory carrier powder used to form layer 21 can be mixed with the electrolyte material 22 ground to a fine powder and the mixture flame sprayed onto each face 44, 45 of the central portion of core 20. Other well known techniques of forming a paste electrolyte may also be practiced such as molding the heat mixture with cooled metal stamps or hydraulic pressing followed by subsequent baking.

To complete manufacture, the peripheral portion 29 of core 20 is unmasked and the central portion 30 bearing the refractory layer 21 upon portion 28 of core 20 masked. Tab 43 is likewise masked. To the peripheral portion excepting tab 43 is then applied a flame sprayed refractory layer 27 of very fine particle size, such as −325 mesh, so that a nonporous border is formed about the periphery member 1. This smooth nonporous border is preferably the same thickness as layer 21. It prevents the electrolyte from evaporating excessively from the carrier. Also it provides a smooth even surface that will seal properly against the mica gaskets. If one desires, a glaze may be applied to the nonporous layer 27. It should be pointed out that layer 27 may be omitted. Layer 21 will then extend about central portion 28 and peripheral portion 29 of core 20. If layer 27 is omitted, the capillary potential of layer 21 is all that is retaining electrolyte 22 within matrix 19. Without the seal provided by layer 27, the porosity must be uniform so there is a uniform capillary potential.

Referring to FIG. 4, another embodiment of the matrix 19 is shown. In this embodiment, core 20 comprises a screen such as described for the previous embodiment. A sintered metallic layer is then affixed about core 20 so as to form a porous sheet 47 having a thickness of about 5–30 mils. Carbonyl nickel or silver powder have proven to be the most suitable materials for sheet 47. If nickel powder is used, it can advantageously be doped with nickel boride so as to form a more corrosion resistant sheet 47. It should be now apparent that those materials suitable for forming core 20 are also suitable for forming sheet 47.

While a metal powder sintered onto a screen is preferred for sheet 47, the screen comprising core 20 may be omitted at some sacrifice in strength and flexibility. Sheet 47 without core 20 can also be fabricated from metal fibers, especially silver, according to the well known techniques of fiber metallurgy.

Sheet 47 must be sufficiently porous so that electrolyte 22 will saturate sheet 47 and provide a continuous ionic path through the sheet's cross section. To sheet 47 is then applied a porous refractory coat 21 on the central portion 28 of sheet 47 and a nonporous sealing refractory coat 27 about the outer periphery 29 of sheet 47.

The completed carrier now coated with refractory awaits application of electrolyte. As was stated previously, the electrolyte may be applied in combination with the refractory 21 so as to form a paste electrolyte. I prefer, however, to first form matrix 19 and then apply electrolyte 22 by immersing the whole of matrix 19 into a bath of molten electrolyte. An even more convenient method, however, is to make use of tab 43 (shown in FIG. 2).

In an embodiment having tab 43, only the tab is dipped into molten electrolyte. The molten electrolyte permeates the porous refractory layer 21 on tab 43. Thence the electrolyte 22 is drawn upward by capillary action into the porous refractory layer 21 on the central portion 30 of matrix 19 until the whole of the porous matrix 19 is saturated with electrolyte. After assembly in a fuel cell, tab 43 provides a convenient point to attach a reference electrode, replenish any lost electrolyte, or to change electrolyte.

The matrix 19 carrying electrolyte 22 is now ready for installation in fuel cell 11 shown in FIG. 1. It should be appreciated that the cell of FIG. 1 is illustrative of one incorporation of my invention within a fuel cell and is not intended to limit the scope of my invention. In assembling the cell, nut 34 is tightened to bring flanges 16 of endwalls 13, 14 together. As the nut is tightened the electrodes 17, 18 held in seat 15 of endwalls 13, 14 are brought into surface engagement with matrix 19. To insure uniform contact of surfaces 23, 24 and 25, 26 between the matrix 19 and electrodes, the nut 34 is tightened sufficiently to place matrix 19 under slight compression. Placing prior art matrices under equivalent compression would crack them. Surprisingly compression applied to matrix 19 will not cause deleterious cracking. I have found that the flexure of core 20 will take up the compression, and furthermore that any cracks that do develop do not penetrate completely through matrix 19. That is, a crack in layer 21 will only extend from the surface 23 to the face 44 of core 20. It there stops and does not continue through to surface 25. Of course, if undue pressure is placed on the matrix by overtightening nut 33 it will eventually shatter. One skilled in the art can easily determine the correct degree of compression. The electrode members 17, 18 can be made of any suitable porous materials that resist the corrosive action of the electrolyte. Furthermore, electrode 18 must not deteriorate in the presence of oxygen. Electrode materials are well known in the art and examples of satisfactory materials are nickel fuel electrodes and silver or silver coated nickel oxidant electrodes. Electrodes 17, 18 should preferably have a capillary potential less than that of the capillary potential of the refractory layer 21 upon matrix 19. This will prevent flooding of the electrode surfaces 24, 26 which are in adherent contact with the matrix surfaces 23, 25. During operation, the molten electrolyte flows from the pores of the refractory into the pores of electrodes 17, 18. The electrolyte does not, however, completely saturate the pores of electrodes 17, 18 but only penetrates about ⅓ of the way into the porous electrode structure. At the boundary of the electrolyte and electrode are formed what are known as electrolyte fronts or reaction boundary interfaces. It is at these interfaces that the electrochemical reactions of the cell occur.

A fuel gas, for example hydrogen, is fed from a suitable source into pipe 50, through inlet port 40 and into gas space 38. There the fuel gas diffuses through the porous electrode 17 until it reaches the electrolyte boundary interface. At the interface the fuel is activated and electrochemically oxidized. Taking $Li_2CO_3$ as an exemplary electrolyte 22, the fuel electrode half cell reaction would be

$$H_2 + CO_3^= \rightarrow H_2O + CO_2 + 2e^-$$

Simultaneously oxidant exemplified by oxygen is fed from a suitable source through pipe 51 and inlet port 41 into the oxidant gas space 39. The oxidant diffuses through the porous electrode 18 until it reaches the electrolyte boundary interface. There it is activated and electrochemically reduced. Sufficient $CO_2$ intermixed with the oxidant must be supplied to replace that lost as waste gas in the fuel electrode reaction. The half cell reaction at the oxidant electrode is as follows:

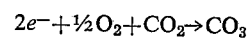
$$2e^- + \tfrac{1}{2}O_2 + CO_2 \rightarrow CO_3^=$$

From these reactions comes the electromotive force which may be harnessed to do useful work. The excess of electrons at fuel electrode and a deficiency at the oxidant electrode causes an electronic current in the external load circuit 48 connecting the electrodes 17, 18.

Having now particularly described and ascertained the nature of my said invention and the manner in which it is to be performed, I declare that what I claim is:

1. An electrolyte carrier matrix for molten electrolyte fuel cells comprising a thin, flat, malleable, porous support core, said core having a central portion and a peripheral portion; a heavy continuous layer of a porous refractory material adherent upon and completely covering each face of said central portion of said support core, and filling the pores in said central portion of said support core; and a vitreous nonporous refractory seal about said outer peripheral portion of said support core.

2. A carrier according to claim 1 in which said porous refractory is magnesium oxide.

3. A carier according to claim 1 in which said refractory is aluminum oxide.

4. An electrolyte carrier matrix according to claim 1 in which the porous refractory and the porous support core carry an electrolyte.

5. A carrier according to claim 4 in which said electrolyte is an alkali carbonate.

6. An electrolyte carrier matrix for molten electrolyte fuel cells comprising: a flexible support screen, said screen having a central portion and a peripheral portion, said screen having a mesh size equivalent to from about 50 to about 100 Tyler Standard; a heavy continuous layer of a porous refractory adherent upon and completely covering each face of said central portion and filling the screen openings; and a nonporous refractory seal adherent upon said peripheral portion.

7. An electrolyte carrier matrix according to claim 6 in which said support screen is silver.

References Cited

UNITED STATES PATENTS

| | | | |
|---|---|---|---|
| 3,013,098 | 12/1961 | Hunger et al. | 136—86 |
| 3,120,456 | 2/1964 | Broers | 136—86 |
| 3,134,697 | 5/1964 | Niedrach | 136—86 |
| 3,160,527 | 12/1964 | Hess | 136—86 |
| 3,251,718 | 5/1966 | Hilton | 136—86 |
| 3,257,239 | 6/1966 | Schultz et al. | 136—86 |
| 3,276,910 | 10/1966 | Grasselli et al. | 136—86 |
| 3,288,647 | 11/1966 | Beigelman et al. | 136—86 |

ALLEN B. CURTIS, *Primary Examiner.*

U.S. Cl. X.R.

136—86